United States Patent
Hong et al.

(10) Patent No.: US 11,283,702 B1
(45) Date of Patent: Mar. 22, 2022

(54) VEHICLE STATUS DETECTING APPARATUS AND VEHICLE STATUS DETECTING METHOD THEREOF

(71) Applicant: INSTITUTE FOR INFORMATION INDUSTRY, Taipei (TW)

(72) Inventors: I-Chou Hong, Taipei (TW); Chih-Min Shih, Taipei (TW); Hsing-Yu Chen, Taipei (TW); Wen-Kai Liu, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 17/105,531

(22) Filed: Nov. 26, 2020

(30) Foreign Application Priority Data

Oct. 21, 2020 (TW) .................. 109136526

(51) Int. Cl.
*H04L 12/26* (2006.01)
*H04L 12/40* (2006.01)
*B60R 16/023* (2006.01)
*H04L 43/0894* (2022.01)
*H04L 43/0888* (2022.01)

(52) U.S. Cl.
CPC ...... *H04L 43/0894* (2013.01); *B60R 16/0231* (2013.01); *H04L 12/40* (2013.01); *H04L 43/0888* (2013.01); *H04L 2012/40215* (2013.01); *H04L 2012/40273* (2013.01)

(58) Field of Classification Search
CPC . H04L 43/0894; H04L 12/40; H04L 43/0888; H04L 43/40215; H04L 2012/40273; B60R 16/0231
See application file for complete search history.

(56) References Cited

U.S. PATENT DOCUMENTS

| | | | |
|---|---|---|---|
| 10,009,325 B1 * | 6/2018 | David | H04L 9/16 |
| 2017/0295188 A1 * | 10/2017 | David | G06F 21/54 |
| 2018/0191738 A1 * | 7/2018 | David | G06F 21/55 |
| 2018/0316698 A1 * | 11/2018 | David | H04W 12/128 |
| 2018/0349598 A1 * | 12/2018 | Harel | G06F 21/52 |
| 2020/0183373 A1 * | 6/2020 | Choi | G05B 23/0243 |
| 2020/0216027 A1 * | 7/2020 | Deng | B60W 40/09 |
| 2020/0342099 A1 * | 10/2020 | Kerstein | H04L 63/1441 |
| 2021/0197831 A1 * | 7/2021 | Choi | G07C 5/0808 |
| 2021/0360009 A1 * | 11/2021 | David | H04L 63/0236 |

* cited by examiner

*Primary Examiner* — Eric Myers
(74) *Attorney, Agent, or Firm* — CKC & Partners Co., LLC

(57) ABSTRACT

A vehicle status detecting apparatus and a vehicle status detecting method thereof are provided. The vehicle status detecting apparatus stores a piece of decode-related information and a plurality of reference data, and decodes a network packet retrieved on a controller area network (CAN) to obtain a packet data according to the decode-related information. The vehicle status detecting apparatus detects pieces of electronic control unit (ECU) information which correspond to a plurality of bytes of the packet data, and transmits a warning message to the ECU when a detecting result exceeds a standard value of the plurality of reference data.

14 Claims, 10 Drawing Sheets

I1

| B0 | | | | | | | | B1 | | | | | | | | B2 | | | | | | | | B3 | | | | | | | | B4 | | | | | | | |
|---|---|---|---|---|---|---|---|---|---|---|---|---|---|---|---|---|---|---|---|---|---|---|---|---|---|---|---|---|---|---|---|---|---|---|---|---|---|---|
| | Name: Steering Wheel Torque Command and Lane Maintenance Assist – Identity: 2E4 |||||||||||||||||||||||||||||||||||||
| 7 | 6 | 5 | 4 | 3 | 2 | 1 | 0 | 15 | 14 | 13 | 12 | 11 | 10 | 9 | 8 | 23 | 22 | 21 | 20 | 19 | 18 | 17 | 16 | 31 | 30 | 29 | 28 | 27 | 26 | 25 | 24 | 39 | 38 | 37 | 36 | 35 | 34 | 33 | 32 |
| 1 | colspan="7" | Packet count | colspan="8" | Steering torque command | colspan="16" | LMA status | colspan="8" | Packet calibration value |||||||||||||||||||||||||||||||

I2

Name: Steering Angle Sensor – Identity: 0x25

| B0 | B1 | B2 | B3 | B4 | B5 | B6 | B7 |
|---|---|---|---|---|---|---|---|
| 7 6 5 4 3 2 1 0 | 15 14 13 12 11 10 9 8 | 23 22 21 20 19 18 17 16 | 31 30 29 28 27 26 25 24 | 39 38 37 36 35 34 33 32 | 47 46 45 44 43 42 41 40 | 55 54 53 52 51 50 49 48 | 63 62 61 60 59 58 57 56 |
| Steering angle | | | Angle | | Angular rate | | Packet calibration value |

I3

Name: Vehicle Speed Sensor – Identity: 0xB4

| B0 | B1 | B2 | B3 | B4 | B5 | B6 | B7 |
|---|---|---|---|---|---|---|---|
| 7 6 5 4 3 2 1 0 | 15 14 13 12 11 10 9 8 | 23 22 21 20 19 18 17 16 | 31 30 29 28 27 26 25 24 | 39 38 37 36 35 34 33 32 | 47 46 45 44 43 42 41 40 | 55 54 53 52 51 50 49 48 | 63 62 61 60 59 58 57 56 |
| | | | Encoder | | Speed | | Packet calibration value |

In

Name: Wheel Speed Sensor – Identity: 0xAA

| B0 | B1 | B2 | B3 | B4 | B5 | B6 | B7 |
|---|---|---|---|---|---|---|---|
| 7 6 5 4 3 2 1 0 | 15 14 13 12 11 10 9 8 | 23 22 21 20 19 18 17 16 | 31 30 29 28 27 26 25 24 | 39 38 37 36 35 34 33 32 | 47 46 45 44 43 42 41 40 | 55 54 53 52 51 50 49 48 | 63 62 61 60 59 58 57 56 |
| Wheel speed sensor-Front right | Wheel speed sensor-Front left | | | Wheel speed sensor-Rear right | | Wheel speed sensor-Rear left | |

FIG. 3

| Timestamp | Name | Identity | Number | B0 | B1 | B2 | B3 | B4 | B5 | B6 | B7 | |
|---|---|---|---|---|---|---|---|---|---|---|---|---|
| (1599635548.665565) | can0 | 0AA | [8] | 2D | 8F | 2D | 83 | 2D | 8C | 2D | 78 | |
| (1599635548.665794) | can0 | 1AA | [6] | 00 | 00 | 00 | 00 | 00 | B1 | | | |
| (1599635548.666001) | can0 | 22B | [4] | 7C | 86 | 00 | 30 | | | | | |
| (1599635548.666126) | can0 | 232 | [4] | 1C | 1A | 00 | 6E | | | | | |
| (1599635548.666424) | can0 | 260 | [8] | 0B | 00 | 0A | 00 | 00 | 00 | 49 | C5 | |
| (1599635548.666662) | can0 | 2C1 | [8] | 00 | 00 | 5E | FC | 86 | C2 | 00 | 6D | |
| (1599635548.667226) | can0 | 343 | [8] | FF | A5 | A1 | 40 | 00 | FF | 00 | D2 | |
| (1599635548.669475) | can0 | 640 | [8] | A8 | 00 | 00 | 4E | 01 | 58 | 00 | 00 | |
| (1599635548.669613) | can0 | 3D3 | [2] | 00 | 8D | | | | | | | |
| (1599635548.670743) | can0 | 2E4 | [5] | 83 | 00 | 0D | 00 | 7B | | | | ~P1 |
| (1599635548.671763) | can0 | 0B4 | [8] | 00 | 00 | 00 | 00 | 85 | 13 | 7E | D2 | |
| (1599635548.672022) | can0 | 025 | [8] | 00 | 06 | 00 | 03 | 00 | 00 | 00 | 36 | |
| (1599635548.672281) | can0 | 1C4 | [8] | 05 | EB | 24 | 08 | 34 | 00 | C0 | DD | |
| (1599635548.672554) | can0 | 1D2 | [8] | F9 | 30 | 00 | 09 | 00 | 89 | 80 | 16 | |
| (1599635548.672810) | can0 | 024 | [8] | 02 | 02 | 02 | 10 | 41 | FD | 80 | 00 | |
| (1599635548.673079) | can0 | 23 | [8] | 00 | 00 | 00 | 00 | 00 | 00 | 00 | 2D | |
| (1599635548.675941) | can0 | 1D3 | [8] | 00 | D0 | 35 | 11 | F6 | 00 | 00 | E8 | |
| (1599635548.677587) | can0 | 0AA | [8] | 2D | 8F | 2D | 85 | 2D | 7A | 2D | 85 | |
| (1599635548.680432) | can0 | 2E4 | [5] | 85 | 00 | 0C | 00 | 7C | | | | ~P2 |
| (1599635548.683632) | can0 | 0BA | [4] | 01 | EF | 00 | AE | | | | | |
| (1599635548.683959) | can0 | 224 | [8] | 00 | 00 | 00 | 80 | 00 | 00 | 00 | 08 | |
| (1599635548.684215) | can0 | 025 | [8] | 00 | 06 | 00 | 03 | 00 | 00 | 00 | 36 | |
| (1599635548.684550) | can0 | 024 | [8] | 02 | 02 | 02 | 0E | 41 | FC | 80 | FD | |
| (1599635548.684681) | can0 | 2D5 | [2] | 0C | 8D | | | | | | | |
| (1599635548.685870) | can0 | 260 | [8] | 08 | 00 | 09 | 00 | 00 | FF | FC | 76 | |
| (1599635548.687202) | can0 | 283 | [7] | 00 | 00 | 00 | 00 | 00 | 00 | 8C | | |
| (1599635548.687852) | can0 | 262 | [5] | 00 | 00 | 00 | 0A | 73 | | | | |
| (1599635548.689627) | can0 | 0AA | [8] | 2D | 87 | 2D | 7F | 2D | 6D | 2D | 8E | |
| (1599635548.689764) | can0 | 22B | [4] | 7C | 86 | 88 | 30 | | | | | |
| (1599635548.692320) | can0 | 2E4 | [5] | 87 | FF | F6 | 00 | 67 | | | | ~P3 |
| (1599635548.695447) | can0 | 1D0 | [8] | 0B | E2 | 10 | 00 | 00 | 22 | 02 | FA | |
| (1599635548.695594) | can0 | 1C4 | [8] | 05 | ED | 24 | 08 | 34 | 00 | C0 | DF | |
| (1599635548.696066) | can0 | 0B4 | [8] | 00 | 00 | 00 | 00 | 89 | 13 | 77 | CF | |
| (1599635548.696327) | can0 | 344 | [8] | 00 | 00 | 01 | 00 | 00 | 00 | 00 | 50 | |
| (1599635548.696551) | can0 | 025 | [8] | 00 | 06 | 00 | 03 | 00 | 00 | 00 | 36 | |
| (1599635548.696798) | can0 | 024 | [8] | 02 | 02 | 02 | 0B | 41 | FE | 80 | FC | |
| (1599635548.697049) | can0 | 223 | [8] | 00 | 00 | 00 | 00 | 00 | 00 | 00 | 2D | |
| (1599635548.697431) | can0 | 2C1 | [8] | 00 | 00 | 49 | FC | 81 | C2 | 00 | 53 | |
| (1599635548.699216) | can0 | 343 | [8] | FF | AB | A1 | 40 | 00 | FF | 00 | D8 | |

Name: Steering Wheel Torque Command and Lane Maintenance Assist – Identity: 2E4

| | B0 | | | | | | | | B1 | | | | | | | | B2 | | | | | | | | B3 | | | | | | | | B4 | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 15 | 14 | 13 | 12 | 11 | 10 | 9 | 8 | 23 | 22 | 21 | 20 | 19 | 18 | 17 | 16 | 31 | 30 | 29 | 28 | 27 | 26 | 25 | 24 | 39 | 38 | 37 | 36 | 35 | 34 | 33 | 32 |
| I1 | Packet count | | | | | | | | Steering torque command | | | | | | | | | | | | | | | | LMA status | | | | | | | | Packet calibration value | | | | | | | |
| | 1 | | | | | | | 1 | | | | | | | | | | | | | | | | | | | | | | | | | | | | | | | | |

PD1
| | B0 | | | | | | | | B1 | | | | | | | | B2 | | | | | | | | B3 | | | | | | | | B4 | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 83 | | | | | | | | 00 | | | | | | | | 0D | | | | | | | | 00 | | | | | | | | 7B | | | | | | | |
| | 1 | 0 | 0 | 0 | 0 | 0 | 1 | 1 | 0 | 0 | 0 | 0 | 0 | 0 | 0 | 0 | 0 | 0 | 0 | 0 | 1 | 1 | 0 | 1 | 0 | 0 | 0 | 0 | 0 | 0 | 0 | 0 | 0 | 1 | 1 | 1 | 1 | 0 | 1 | 1 |
| | 1 | | | | | | | 1 | +13 | | | | | | | | | | | | | | | | 0 | | | | | | | | 123 | | | | | | | |

PD2
| | B0 | | | | | | | | B1 | | | | | | | | B2 | | | | | | | | B3 | | | | | | | | B4 | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 85 | | | | | | | | 00 | | | | | | | | 0C | | | | | | | | 00 | | | | | | | | 7C | | | | | | | |
| | 1 | 0 | 0 | 0 | 0 | 1 | 0 | 1 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 1 | 1 | 1 | 1 | 1 | 0 | 0 |
| | 2 | | | | | | | 1 | +12 | | | | | | | | | | | | | | | | 0 | | | | | | | | 124 | | | | | | | |

PD3
| | B0 | | | | | | | | B1 | | | | | | | | B2 | | | | | | | | B3 | | | | | | | | B4 | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 87 | | | | | | | | FF | | | | | | | | F6 | | | | | | | | 00 | | | | | | | | 67 | | | | | | | |
| | 1 | 0 | 0 | 0 | 0 | 1 | 1 | 1 | 1 | 1 | 1 | 1 | 1 | 1 | 1 | 1 | 1 | 1 | 1 | 1 | 0 | 1 | 1 | 0 | 0 | 0 | 0 | 0 | 0 | 0 | 0 | 0 | 0 | 1 | 1 | 0 | 0 | 1 | 1 | 1 |
| | 3 | | | | | | | 1 | -10 | | | | | | | | | | | | | | | | 0 | | | | | | | | 103 | | | | | | | |

| PD1 | | | | | | | |
|---|---|---|---|---|---|---|---|
| 1 0 0 0 0 0 1 1 | 0 0 0 0 0 0 0 0 | 0 0 0 0 1 1 0 1 | 0 0 0 0 0 0 0 0 | 0 1 1 1 1 0 1 1 | 1 0 0 0 0 0 1 1 | | |
| 83 | 00 | 0D | 00 | 7B | | | |
| 1 1 | | +13 | | 123 | | | |
| Time | Packet count | | | Packet calibration value | | | |
| 2020/9/9 15:12:28.670743 | 1 | | | 0x83(byte0)+0x00(byte1)+0x0D(byte2)+0x00(byte3)+5(Data length)+ 0xE6(CAN ID)+0x90(byte i)+5(Data length)] & 0xFF = [0x02(CAN ID(H))+0xE4(CAN ID(L))+ = [0xE6(CAN ID)+0x90(byte i)+5(Data length)] & 0xFF = 0x17B & 0xFF = 0x7B | | | |

| PD2 | | | | | | | |
|---|---|---|---|---|---|---|---|
| 1 0 0 0 0 1 0 1 | 0 0 0 0 0 0 0 0 | 0 0 0 0 1 1 0 0 | 0 0 0 0 0 0 0 0 | 0 1 1 1 1 1 0 0 | | | |
| 85 | 00 | 0C | 00 | 7C | | | |
| 2 1 | | +12 | | 124 | | | |
| Time | Packet count | | | Packet calibration value | | | |
| 2020/9/9 15:12:28.680432 | 2 | | | 0x85(byte0)+0x00(byte1)+0x0C(byte2)+0x00(byte3)+5(Data length)+ [0x02(CAN ID(H))+0xE4(CAN ID(L))+ = [0xE6(CAN ID)+0x91(byte i)+5(Data length)] & 0xFF = 0x17C & 0xFF = 0x7C | | | |

| PD3 | | | | | | | |
|---|---|---|---|---|---|---|---|
| 1 0 0 0 0 1 1 1 | 1 1 1 1 1 1 1 1 | 1 1 1 1 0 1 1 0 | 0 0 0 0 0 0 0 0 | 0 1 1 0 0 1 1 1 | | | |
| 87 | FF | F6 | 00 | 67 | | | |
| 3 1 | | -10 | | 103 | | | |
| Time | Packet count | | | Packet calibration value | | | |
| 2020/9/9 15:12:28.692320 | 3 | | | 0x87(byte0)+0xFF(byte1)+0xF6(byte2)+0x00(byte3)+5(Data length)+ [0x02(CAN ID(H))+0xE4(CAN ID(L))+ = [0xE6(CAN ID)+0x27C(byte i)+5(Data length)] & 0xFF = 0x367 & 0xFF = 0x67 | | | |

FIG. 6

VEHICLE STATUS DETECTING APPARATUS AND VEHICLE STATUS DETECTING METHOD THEREOF

RELATED APPLICATIONS

This application claims priority to Taiwan Application Number 109136526, filed on Oct. 21, 2020, which is herein incorporated by reference.

BACKGROUND

Field of Disclosure

The present disclosure relates to a vehicle status detecting apparatus and a vehicle status detecting method thereof. More particularly, the present disclosure relates to a vehicle status detecting apparatus and a vehicle status detecting method thereof capable of determining whether or not one of a plurality of status information of a plurality of internet packets in a controller area network exceeds one of a plurality of ranges of the plurality of status information that are collected in advance to detect whether or not a plurality of vehicle statuses are abnormal.

Description of Related Art

As technology rapidly advances, various types of vehicles can be installed with any type of electronic system, the electronic system is configured to control a plurality of electronic control units (hereinafter abbreviated as ECUs) that are cooperating with component parts installed in the vehicle, and perform detection to the plurality of ECUs. Nowadays, a controller area network (hereinafter abbreviated as CAN) protocol is a vehicle bus standard widely used in vehicles, the CAN protocol allows the plurality of ECUs of the vehicle to communicate with each other.

In addition, thanks to the maturity of mobile communication technology, telematics is also one of main applications in the industry, so there will be more and more vehicles installed with the ECUs capable of communication. However, the communications between the ECUs in the CAN are based on a broadcast mechanism that is an information-oriental transmission protocol, and lack an information security protection mechanism to the transmitted messages inside the CAN. Consequently, an intruder may easily hack the electronic system of the vehicle by an electronic device capable of mobile wireless communication to manipulate operations of the vehicle, which may be hazardous to the driving safety of the vehicle.

Therefore, how to provide an information security protection mechanism for the CAN to protect the electronic system of the vehicle from being hacked has become a critical issue of the industry.

SUMMARY

It is therefore an objective of the present disclosure to provide a an information security protection mechanism for a controller area network, in which a plurality of normal status information are collected to be set to a plurality of reference values to determine whether or not an electronic control unit has been hacked and a vehicle operating status is abnormal, and a warning message is transmitted to the electronic system of the vehicle when a risk of information security is encountered. Accordingly, the information security protection mechanism of the present disclosure can effectively monitor the information security of the vehicle, in order to protect the electronic system of the vehicle from being hacked and manipulated by an intruder, which reduces the risk of information security and also improves the driving safety of the vehicle.

An aspect of the present disclosure is to provide a vehicle status detecting apparatus including a transceiver, a storage device and a processor. The storage device is configured to store decode-related information and a plurality of reference data. The processor is electrically connected to the transceiver and the storage device, and configured to execute the following steps: receiving, by the transceiver, a first internet packet transmitted by an electronic control unit (ECU) through a controller area network, the first internet packet including a first packet data, the first packet data including a plurality of bytes, the plurality of bytes corresponding to pieces of status information of the ECU; decoding the first packet data according to the decode-related information, to obtain a plurality of data values of the pieces of status information corresponding to the plurality of bytes; detecting the plurality of data values of the pieces of status information corresponding to the plurality of bytes according to the plurality of reference data, to generate a plurality of detecting results of the pieces of status information; and transmitting, by the transceiver, a warning message to the ECU based on the plurality of detecting results when one of the plurality of detecting results exceeds a standard value corresponding to one of the plurality of reference data.

Another aspect of the present disclosure is to provide a vehicle status detecting method utilized in a vehicle status detecting apparatus. The vehicle status detecting apparatus includes a transceiver, a storage device and a processor. The storage device is configured to store a decode-related information and plurality of reference data the vehicle status detecting method being executed by the processor. The vehicle status detecting method comprising the following steps: receiving, by the transceiver, a first internet packet transmitted by an electronic control unit (ECU) through a controller area network, the first internet packet including a first packet data, the first packet data including a plurality of bytes, the plurality of bytes corresponding to pieces of status information of the ECU; decoding the first packet data according to the decode-related information, to obtain a plurality of data values of the pieces of status information corresponding to the plurality of bytes; detecting the plurality of data values of the pieces of status information corresponding to the plurality of bytes according to the plurality of reference data, to generate a plurality of detecting results of the pieces of status information; and transmitting, by the transceiver, a warning message to the ECU based on the plurality of detecting results when one of the plurality of detecting results exceeds a standard value corresponding to one of the plurality of reference data.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

FIG. 3 is a schematic view of a plurality of decode-related information stored in a decoded database according the first embodiment of the present disclosure.

FIG. 4 is a schematic view of a data flow received by the vehicle status detecting apparatus according the first embodiment of the present disclosure.

FIG. 5 is a schematic view of decoding internet packets using decode-related information according a second embodiment and a third embodiment of the present disclosure.

FIG. 6 is a schematic view of detecting a count and a calibration value according the third embodiment of the present disclosure.

DETAILED DESCRIPTION

Figure 1:
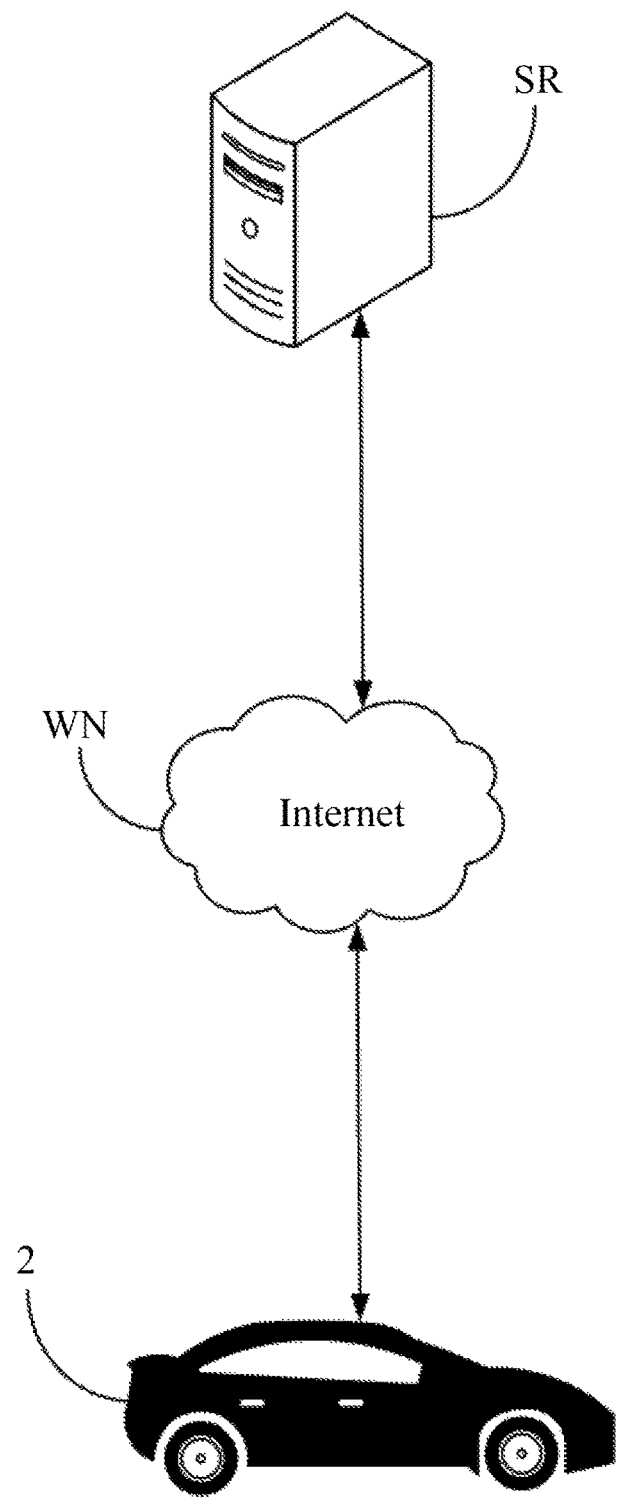
FIG. 1 is a schematic view of a vehicle status detecting apparatus according a first embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
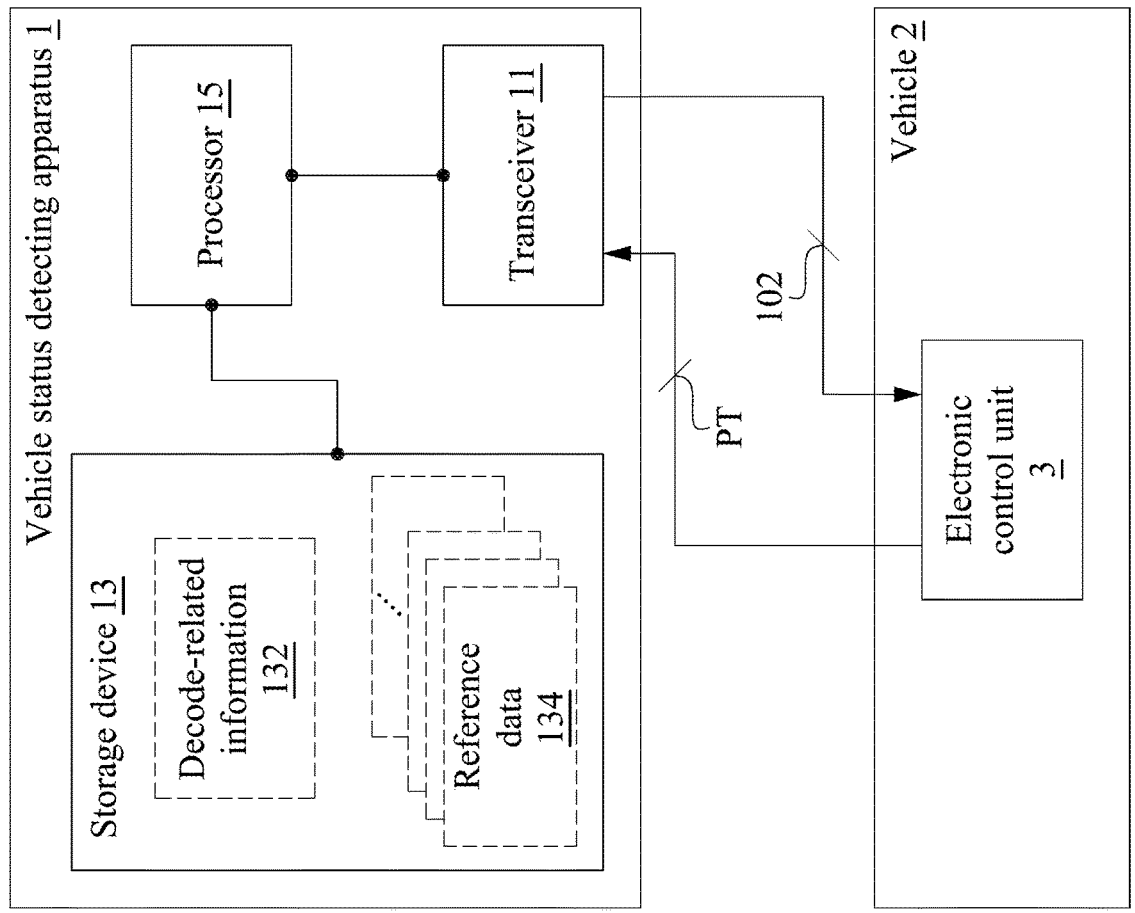
FIG. 2 is a schematic view of a vehicle status detecting apparatus according the first embodiment of the present disclosure.

A first embodiment of the present disclosure is provided in FIG. 1 to FIG. 4. FIG. 1 and FIG. 2 are schematic views of a vehicle status detecting apparatus 1 according to the first embodiment of the present disclosure. The vehicle status detecting apparatus 1 includes a transceiver 11, a storage device 13 and a processor 15. The transceiver 11 and storage device 13 are electrically connected to the processor 15.

The vehicle status detecting apparatus 1 of the present disclosure can act as a cloud server SR, and connect to an ECU (electronic control unit) 3 of a vehicle 2 through an internet WN (e.g., a mobile communication internet, Wi-Fi, and the like). The vehicle 2 illustrated in FIG. 2 merely includes one ECU 3 for briefly description; however, the vehicle 2 may include a plurality of ECUs corresponding to a plurality of operations of the vehicle 2, such as but not limited to a steering angle, a vehicle speed, a wheel speed, revolutions per minute of an engine and the like, and the plurality of ECUs can communicate with each other through a CAN (controller area network).

The storage device 13 is configured to store a decode-related information (i.e., a decoding library) 132 and a plurality of reference data 134. Specifically, the storage device 13 is configured to store a decoded database (not shown in the figures), the decoded database is configured to store a plurality of decode-related information corresponding to a plurality identities of the plurality of ECUs in the CAN. The plurality of decode-related information include a plurality of bytes, and each of the plurality of bytes includes a number of bits. The plurality of decode-related information corresponding to pieces of status information of the plurality ECUs will be placed in a part of the number of bits in the decode-related information.

The processor 15 is configured to receive a first internet packet PT transmitted from the ECU 3 by the transceiver 11 through the CAN. The first internet packet PT includes a first packet data, the first packet data includes the plurality of bytes, and the plurality of bytes correspond to pieces of status information of the ECU 3.

The processor 15 is configure to determine a packet identity of the first internet packet PT and look for an identity corresponding to the decode-related information 132 that is identical to the packet identity of the first internet packet PT in the decoded database. The processor 15 decodes the first packet data according to the identity corresponding to the decode-related information 132 that is identical to the packet identity of the first internet packet PT, so as to obtain a plurality of data values of the pieces of status information corresponding to the plurality of bytes.

After the first internet packet PT had been decoded, the processor 15 detects the plurality of data values of the pieces of status information according to the plurality of reference data 134 stored in the storage device 13, so as to generate a plurality of detecting results corresponding to the plurality status information. The processor 15 transmits, by the transceiver 11, a warning message 102 to the ECU 3 based on the plurality of detecting results when one of the plurality of detecting results exceeds one of a plurality of standard values corresponding to the plurality of reference data 134.

For example, reference is made to FIG. 3 to FIG. 5, FIG. 3 is a schematic view of a plurality of decode-related information stored in a decoded database according an embodiment of the present disclosure. The decoded database includes a plurality of decode-related information I1 to In, and the plurality of decode-related information I1 to In correspond a plurality of identities of a plurality of ECUs, respectively. As shown in FIG. 3, the decode-related information I1 corresponds to an ECU named "steering torque command and lane maintenance assist", which is abbreviated as "LMA" in FIG. 3, and having an identity "2E4". The decode-related information I2 corresponds to an ECU named "steering angle sensor" and having an identity "0x25". The decode-related information I3 corresponds to an ECU named "vehicle speed sensor" and having an identity "0xB4". The decode-related information corresponding to ECU named "wheel speed sensor" and having an identity "0xAA".

Then, reference is made to FIG. 4, and FIG. 4 is a schematic view of a data flow DF received by the vehicle status detecting apparatus according the first embodiment of the present disclosure. The processor 15 receives, by the transceiver 13, the data flow DF from a plurality of ECUs during a time interval from a timestamp "1599638848.665565" to a timestamp "1599635548.696066". The data flow DF includes a plurality of internet packets, and for each internet packet, a timestamp of the internet packet, a name of the controller area network to which the ECU belongs, the identity of the ECU, a plurality of bytes included in the packet data and a plurality of values of bits with hexadecimal representation in one byte are given before the internet packet is decoded.

Given that the processor 15 is going to decode the packet data PD1 of the internet packet P1 having the identity "2E4", the processor 15 analyzes the pieces of status information corresponding to the plurality of bytes according to the decode-related information I1 corresponding to the identity "2E4" in the decoded database, so as to obtain a plurality of data values of the pieces of status information corresponding to the plurality of bytes. In detail, reference is made to FIG. 3, in the decode-related information I1, a byte B0 corresponds to a packet count, a byte B1 corresponds to a steering torque command, a byte B3 corresponds to a lane maintenance assist, and a byte B4 corresponds to a packet calibration value.

Each of the plurality of bytes of the packet data PD1 is represented by hexadecimal representation. The processor 15 is further configured to convert data "83" of the byte B0, data "00" of the byte B1, data "0D" of the byte B2, data "00" of the byte B3 and data "713" of the byte B4 in the internet packet P1 into binary representation, respectively. After conversion performed by the processor 15, in the packet data PD1, the data of the byte B0 is converted into "10000011", the data of the byte B1 is converted into "00000000", the data of the byte B2 is converted into "00001101", the data of the byte B3 is converted into "000000", and the data of the byte B4 is converted into "01111011".

Afterwards, the processor 15 is further configured to convert the plurality of bytes B0, B1, B2, B3 and B4 in the packet data PD1 from binary representation into decimal representation. During the conversion of decimal representation, the processor 15 is configured to convert the plurality of data values with decimal representation into semantic representation according to a conversion rule for the plurality of bytes corresponding to the pieces of status information in the decode-related information I1, so as to obtain a data value "111" of the pieces of status information corresponding to the byte B0, a data value "+13" of the pieces of status information corresponding to the bytes B1 and B2, a data value "0" of the pieces of status information corresponding to the byte B3, and a data value "123" of the pieces of status information corresponding to the byte B4. After the conversion of decimal representation, semantic information showing "2020/9/9 15:12:28.670743 steering torque being 13 leftward" can be obtained.

Finally, the processor 15 is further configured to detect the plurality of data values of the pieces of status information according to the plurality of reference data, so as to generate a plurality of detecting results corresponding to the pieces of status information; the processor 15 transmits, by the transceiver 11, a warning message to the ECU 3 based on the plurality of detecting results when one of the plurality of detecting results exceeds one of a plurality of standard values corresponding to the plurality of reference data.

It should be noted that those skilled in the art may realize that the abovementioned processing and decoding to the packet data PD1 of the internet packet P1 can be applied to the packet data PD2 of the internet packet P2 as well as the packet data PD3 of the internet packet P3, and will not be reiterated herein.

In one embodiment, the processor 15 receives, by the transceiver 11, a plurality of second internet packets transmitted by the ECU 3 in the controller area network, each of the plurality of second internet packets includes a second packet data including a plurality of bytes. The processor 15 decodes the plurality of second packet data according to the plurality of decode-related information, so as to obtain a plurality of basic data values of the pieces of status information corresponding to the plurality of bytes. The processor 15 analyzes the plurality of basic data values to obtain a plurality of analysis results of the pieces of status information corresponding to the plurality of bytes, and sets the plurality of basic data values being the plurality of reference data based on the plurality of analysis results. In other words, the plurality of reference data are obtained by collecting samples from normal internet packets in advance, decoding the samples to obtain decoded data, and inferring and analyzing the decoded data by the processor 15.

A second embodiment of the present disclosure is shown in FIG. 5. The second embodiment is an extension of the first embodiment. In the second embodiment, the pieces of status information of the ECU corresponding to the plurality of bytes are further explained. Specifically, the pieces of status information include a packet count, a plurality of reference data includes a default count; the processor 15 determines whether or not the packet count and the default count are identical to each other, and the processor 15 transmits, by the transceiver 13, the warning message 102 to the ECU 3 when the packet count is different from the default count.

In detail, reference is made to FIG. 4 and FIG. 5, taking the internet packets P1, P2 and P3 having the identity "2E4" as an example. The processor 15 obtains a packet count being one after the internet packet P1 is decoded, the processor 15 assumes that a packet count of the internet packet P2 being two when the internet packet P2 having the identity "2E4" is received. If the packet count of the internet packet P2 is not two after the internet packet P2 is received and decoded by the processor 15, then the internet packet P2 may be an abnormal packet, and thus the processor 15 transmits the warning message 102 to the ECU 3.

It should be noted that the default count is inducted and obtained according to collected samples, the abovementioned default count and packet count are used for exemplary description, the default count may be set to a number that is the packet count of a previous internet packet increased by two. Those skilled in the art may make modifications and alterations to set the default count according to the abovementioned embodiments, which is not limited.

A third embodiment of the present disclosure is shown in FIG. 5 and FIG. 6. The third embodiment is an extension of the first embodiment and the second embodiment. In this embodiment, the plurality of reference data include a calibration rule, each of the plurality of bytes in the first packet data includes a number of bits, and the pieces of status information includes a packet calibration value. The processor 15 is configured to calculate a default calibration value of the pieces of status information based on the calibration rule, determine whether or not the default calibration value and the packet calibration value are identical to each other, and transmit, by the transceiver 11, the warning message 102 to the ECU 3 when the default calibration value is different from the packet calibration value.

In detail, taking the packet calibration value shown in FIG. 5 and FIG. 6 as an example, the identity includes a most significant byte (i.e., CAN ID (H)) and a least significant byte (i.e., CAN ID (L)). The calibration rule may be a formula for calculating the calibration value, in which the calibration rule is to calculate a sum of a value of the most significant byte, a value of the least significant byte, the bytes B0 to B4 and a byte number, and a masking function (i.e., 0xFF) is applied to the sum. If the calculated default calibration value is different from the packet calibration value, then the internet packet is abnormal.

It should be noted that calibration rule may be designed according to practical requirements by vehicle manufacturers, the abovementioned calibration rule is used for exemplary description, the present disclosure can be provided without limiting the calibration rule.

Figure 7:
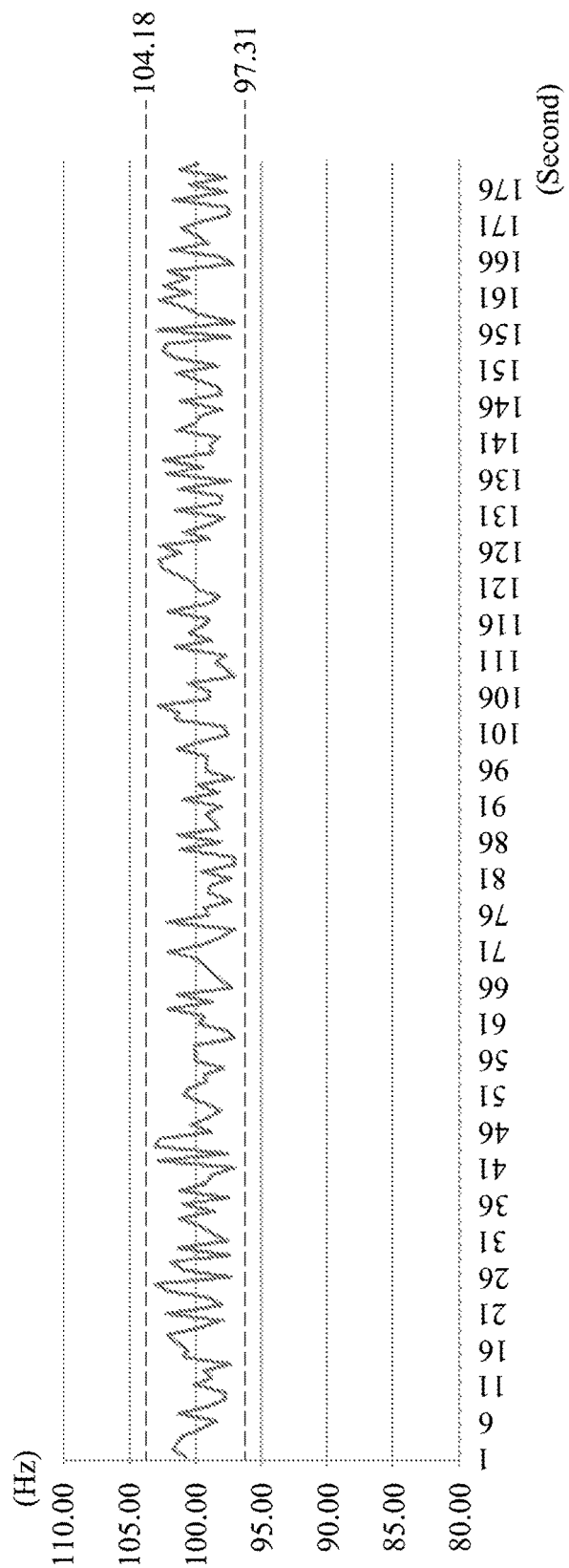
FIG. 7 is a schematic view of a curve showing identity rate versus time (unit: second) according a fourth embodiment of the present disclosure.

A fourth embodiment of the present disclosure is provided in FIG. 4 and FIG. 7. The fourth embodiment is an extension of the first embodiment. In this embodiment, the processor 15 is configured to determine whether or not the ECU is normal according to a packet rate of a plurality of internet packets having an identical identity. Specifically, the internet packet has a first packet identity, the plurality of reference data includes an averaged packet rate corresponding to the first packet identity. The processor 15 is configured to receive, by the transceiver 11, a plurality of second internet packets transmitted by the ECU 3 and a plurality of other ECUs in the controller area network during a time interval. Each of the plurality of second internet packets includes a second packet identity. The processor 15 is configured to calculate a number of the plurality of second packets whose second packet identity is identical to the first packet identity, so as to obtain a packet rate of the first packet identity during the time interval, and determine whether or not the packet rate is greater than the averaged packet rate. The processor 15 transmits, by the transceiver 11, the warning message 102 to the ECU 3 when the packet rate is greater than the averaged packet rate.

For example, reference is made to FIG. 7, given that an averaged packet rate of the internet packet having the packet identity "2E4" is 100 times per second. If the processor 15 calculates that a packet rate of the internet packet having the packet identity "2E4" is 180 times per second during a time interval, then it can be inferred that the ECU corresponding to the packet identity "2E4" might be hacked, so that the processor 15 transmits the warning message 102 to the corresponded ECU.

In addition, in other embodiments, the averaged packet rate may be a range bounded by an upper limit and a lower limit, as shown in the table in FIG. 7.

It should be noted that in other embodiments, there may be various averaged packet rates for various vehicle operations corresponding to the ECUs, so the present disclosure can be provided without limiting the averaged packet rate.

Figure 9:
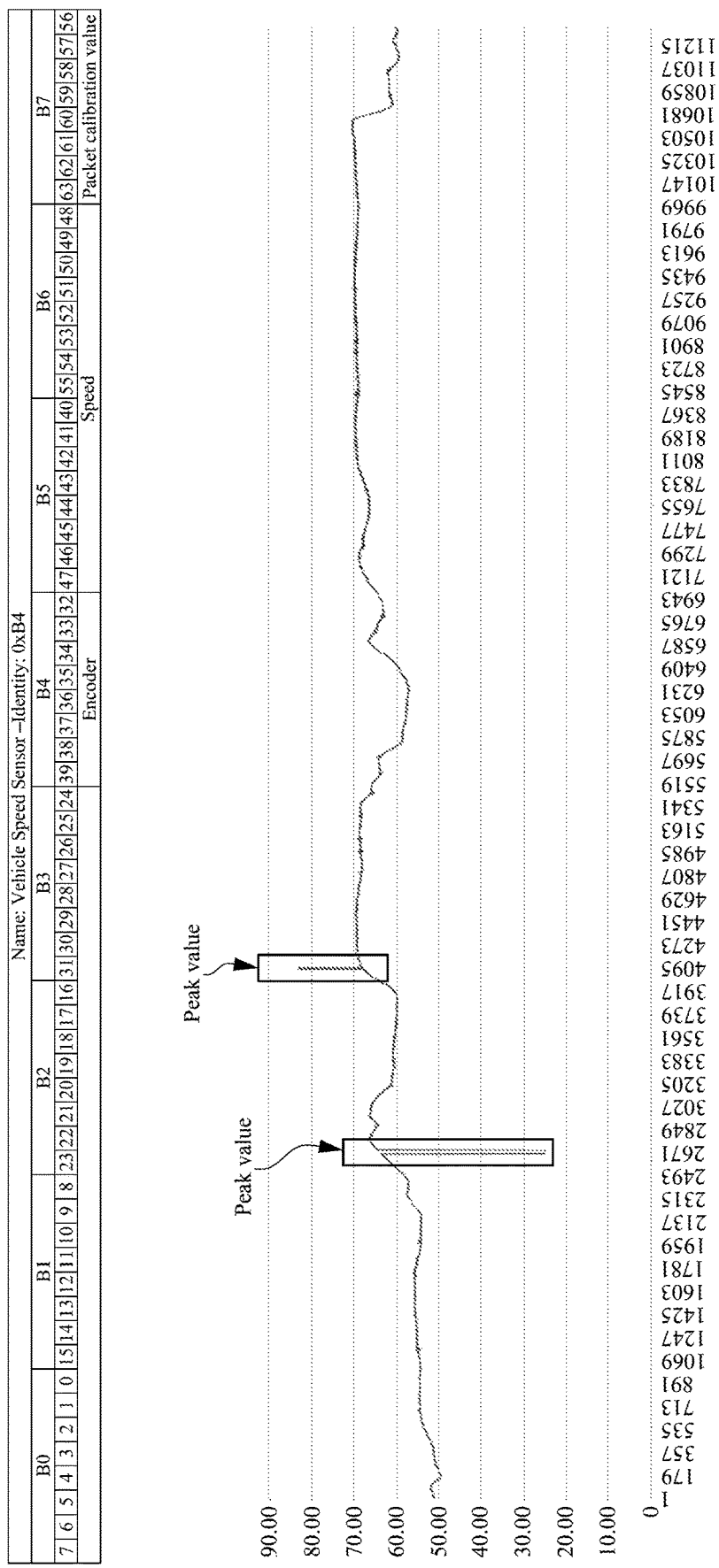
FIG. 9 is a schematic view of a speed trend curve according a fifth embodiment and a sixth embodiment of the present disclosure.

A fifth embodiment of the present disclosure is provided in FIG. 9. The fifth embodiment is an extension of the first embodiment to the fourth embodiment. In this embodiment, each of the plurality of bytes included in the plurality of reference data has a range, the processor 15 is configured to determine whether or not a plurality of values of the plurality of bytes are within a plurality of ranges of the plurality of bytes. The processor 15 transmits, by the transceiver 11, the warning message 102 to the ECU 3 when one of the plurality of values exceeds one of the plurality of ranges corresponding to the pieces of status information.

As described in the abovementioned embodiments, the plurality of bytes corresponding to the pieces of status information and the plurality of reference data include a packet count, the packet calibration value, the averaged packet rate, the vehicle operations, and the like. In this embodiment, the processor 15 is configured to determine whether or not the pieces of status information corresponding to the plurality of bytes is normal based on whether or not the plurality of values of the plurality of bytes are within the plurality of ranges of the pieces of status information.

Figure 8:
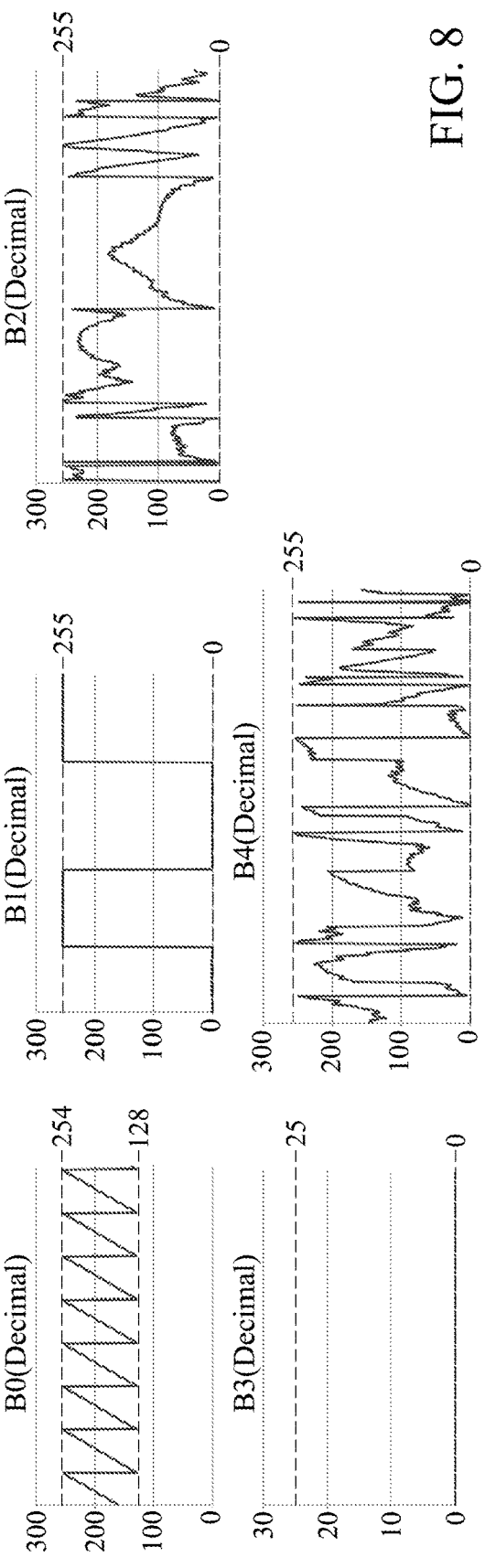
FIG. 8 is a schematic view of a plurality of curves of a plurality of bytes bounded by a plurality of ranges according the fourth embodiment of the present disclosure.

For example, reference is made to FIG. 8, taking decimal representation as an example, given that a range of the byte B0 is bounded by an upper limit being 254 and a lower limit being 128, a range of the byte B1 is bounded by an upper limit being 255 and a lower limit being 0, a range of the byte B2 is bounded by an upper limit being 255 and a lower limit being 0, a range of the byte B3 is bounded by an upper limit being 25 and a lower limit being 0, and a range of the byte B4 is bounded by an upper limit being 255 and a lower limit being 0.

References are made in FIG. 5 to FIG. 8, if the packet count corresponding to the byte B0 is smaller than 128 or greater than 254, then the internet packet P1 is abnormal. If a value of steering torque corresponding to the bytes B1 and B2 is smaller than 0 or greater than 255, then the internet packet P1 is abnormal. If a value of lane maintenance assist corresponding to the byte B3 is smaller than 0 or is greater than 25, then the internet packet P1 is abnormal. If a value of the packet calibration value corresponding to the byte B4 is smaller than 0 or greater than 255, then internet packet P1 is abnormal.

It should be noted that similar to the descriptions regarding the first embodiment, a plurality of ranges of a plurality reference data are obtained by collecting, inferring and analyzing samples in advance, a range for a same type of status information may be varied in different ECUs. Those skilled in the art may realize how the range of the pieces of status information in different ECUs can be modified according to the abovementioned descriptions, which will not be reiterated herein.

A sixth embodiment of the present disclosure is provided in FIG. 9. The sixth embodiment is an extension of the first embodiment to the fifth embodiment. The first internet packet includes a packet identity corresponding to an application category (e.g., a plurality of vehicle operations mentioned in the first embodiment). In this embodiment, the plurality of reference data includes a packet identity corresponding to a trend curve of an application category, the processor 15 is further configured to decide whether or not the first internet packet is abnormal by determining whether or not a peak value exists in the trend curve.

For example, reference is made to FIG. 9, an application category is a vehicle speed, the processor 15 transmits, by the transceiver 11, the warning message 102 to the ECU 3 when it is determined that a peak value (i.e., a value deviates from the trend curve) exists in the trend curve of the vehicle speed.

Figure 10:
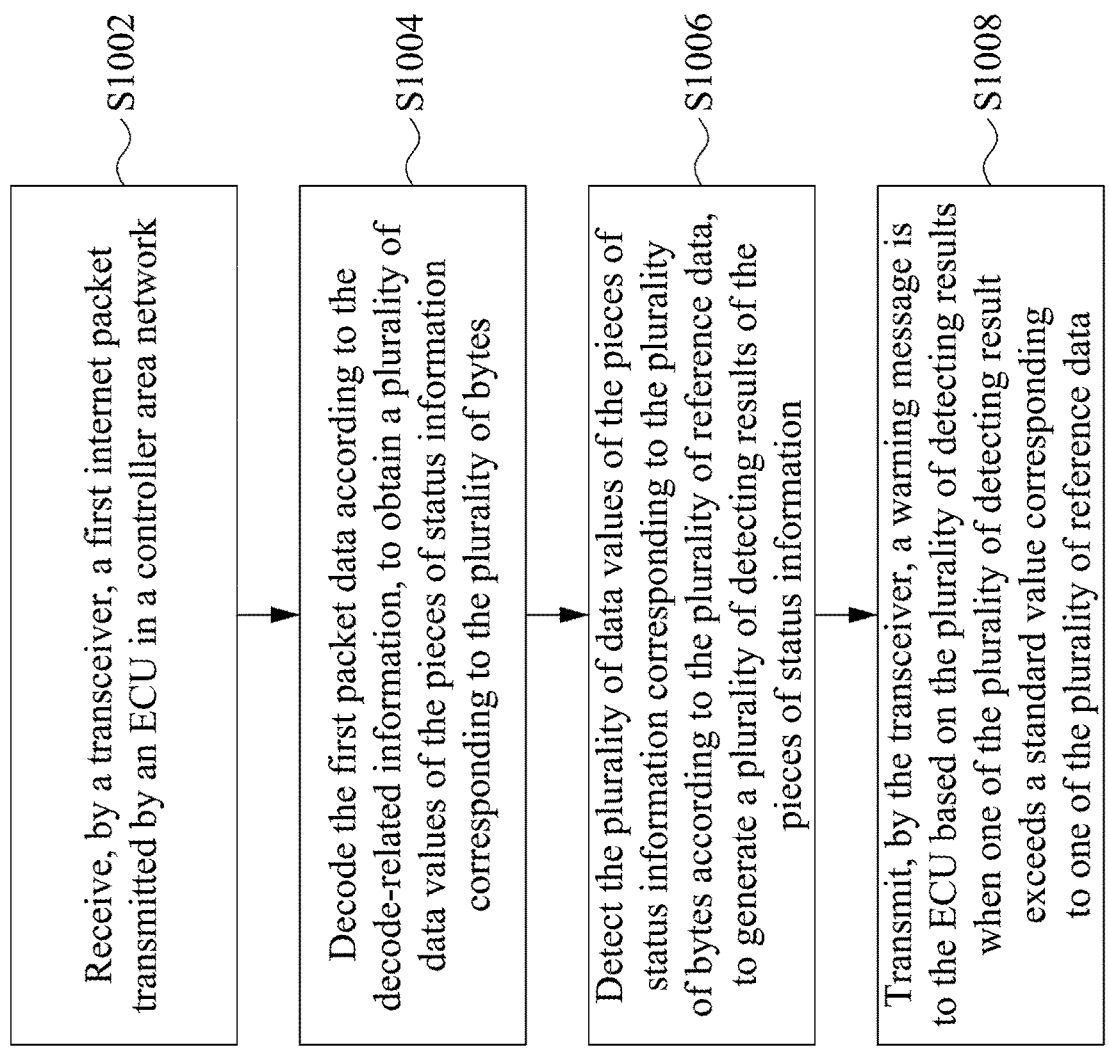
FIG. 10 is a flowchart of a vehicle status detecting method according a seventh embodiment of the present disclosure.

A seventh embodiment of the present disclosure describes a vehicle status detecting method, in which a flowchart is shown in FIG. 10. The vehicle status detecting method is utilized in a vehicle status detecting apparatus, such as the vehicle status detecting apparatus 1 in the abovementioned embodiments. The vehicle status detecting apparatus includes a transceiver, a storage device and a processor. The storage device is configured to store a decode-related information and a plurality of reference data. The vehicle status detecting method can be executed by the processor, and includes the following steps.

First, in step S1002, a first internet packet transmitted by an ECU in a controller area network is received by a transceiver. A first internet packet includes a first packet data, the first packet data includes a plurality of bytes, and the plurality of bytes corresponding to pieces of status information of the ECU.

In step S1004, the first packet data is decoded according to the decode-related information, to obtain a plurality of data values of the pieces of status information corresponding to the plurality of bytes. In step S1006, the plurality of data values of the pieces of status information corresponding to the plurality of bytes are detected according to the plurality of reference data, to generate a plurality of detecting results of the pieces of status information. In step S1008, a warning message is transmitted by the transceiver to the ECU based on the plurality of detecting results when one of the plurality of detecting results exceeds a standard value corresponding to one of the plurality of reference data.

In other embodiments, the vehicle status detecting method further includes steps of receiving, by the transceiver, a plurality of second internet packet transmitted by the ECU in the controller area network, the plurality of first internet packets include a plurality of second packet data, the plurality of second packet data includes the plurality of bytes;

decoding the plurality of second packet data according to the decode-related information, to obtain a plurality of basic data values of the pieces of status information corresponding to the plurality of bytes; analyzing the plurality of basic data values to obtain a plurality of analysis results of the pieces of status information corresponding to the plurality of bytes; and setting the plurality of basic data value being the plurality of reference data based on the plurality of analysis results.

In other embodiments, the plurality of reference data includes a default count, the pieces of status information includes a packet count, the vehicle status detecting method further includes steps of determining whether or not the packet count and the default count are identical to each other; and transmitting, by the transceiver, the warning message to the ECU when the packet count is different from the default count.

In other embodiments, the plurality of reference data includes a default calibration value, each of the plurality of bytes in the first packet data includes a number of bits, the vehicle status detecting method further includes steps of calculating a packet calibration value of the pieces of status information based on the number of bits included in each of the plurality of bytes of the first packet data; determining whether or not the packet calibration value and the default calibration value are identical to each other; and transmitting, by the transceiver, the warning message to the ECU when the packet calibration value is different from the default calibration value.

In other embodiments, the first internet packet includes a first packet identity, the plurality of reference data includes an averaged packet rate corresponding to the first packet identity, the vehicle status detecting method further includes steps of receiving, by the transceiver, a plurality of second internet packets transmitted by the ECU and a plurality of other ECUs in the controller area network during a time interval, each of the plurality of second internet packets including a second packet identity; calculating a number of the plurality of second packets whose second packet identity is identical to the first packet identity, so as to obtain a packet rate of the first packet identity during the time interval; determining whether or not the packet rate is greater than the averaged packet rate; and transmitting, by the transceiver, the warning message to the ECU when the packet rate is greater than the averaged packet rate.

In other embodiments, the plurality of reference data includes a plurality of ranges of the pieces of status information, the vehicle status detecting method further includes steps of determining whether or not a plurality of values of the pieces of status information corresponding to the plurality of bytes are within the plurality of ranges of the pieces of status information; and transmitting, by the transceiver, the warning message to the ECU when one of the plurality of values exceeds one of the plurality of ranges of the pieces of status information.

In other embodiments, the first internet packet includes a packet identity, the packet identity corresponds to an application category, the plurality of reference data includes a trend curve of the application category corresponding to the packet identity, the vehicle status detecting method further includes steps of determining whether or not a peak value exists in the trend curve; and transmitting, by the transceiver, the warning message to the ECU when the peak value exists in the trend curve.

In addition to the abovementioned steps, the vehicle status detecting method of the present disclosure is capable of executing any operations and corresponded functions described in the abovementioned embodiments, those skilled in the art may directly realize how the abovementioned embodiments can be implemented, which will not be reiterated herein.

To sum up, the present disclosure aims at providing information security mechanism for a controller area network by collecting normal internet packets, decoding and analyzing the packet data of the internet packet, such that samples for the packet data included in the pieces of status information can be inferred. The samples can be utilized as references for determining whether or not an internet packet transmitted by the ECU is abnormal, so as to determine whether or not the ECU is hacked, and a warning message can be transmitted to the ECU when there is a risk of information security to the ECU.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A vehicle status detecting apparatus, comprising:
   a transceiver;
   a storage device configured to store a decode-related information and a plurality of reference data; and
   a processor electrically connected to the transceiver and the storage device, and configured to execute the following steps:
   receiving, by the transceiver, a first internet packet transmitted by an electronic control unit (ECU) through a controller area network, the first internet packet including a first packet data, the first packet data including a plurality of bytes, the plurality of bytes corresponding to pieces of status information of the ECU;
   decoding the first packet data according to the decode-related information, to obtain a plurality of data values of the pieces of status information corresponding to the plurality of bytes;
   detecting the plurality of data values of the pieces of status information corresponding to the plurality of bytes according to the plurality of reference data, to generate a plurality of detecting results of the pieces of status information; and
   transmitting, by the transceiver, a warning message to the ECU based on the plurality of detecting results when one of the plurality of detecting results exceeds a standard value corresponding to one of the plurality of reference data.

2. The vehicle status detecting apparatus of claim 1, wherein the processor is further configured to execute the following steps:
   receiving, by the transceiver, a plurality of second internet packets transmitted by the ECU through the controller area network, each of the plurality of second internet packets including a second packet data such that the plurality of second internet packets including a plurality of the second packet data, each of the plurality of the second packet data including the plurality of bytes;
   decoding the second packet data according to the decode-related information, to obtain a plurality of basic data values of the pieces of status information corresponding to the plurality of bytes;
   analyzing the plurality of basic data values to obtain a plurality of analysis results of the pieces of status information corresponding to the plurality of bytes; and setting the plurality of basic data values being the plurality of reference data based on the plurality of analysis results.

3. The vehicle status detecting apparatus of claim 1, wherein each of the plurality of reference data comprises a default count, each of the pieces of status information comprises a packet count, and the processor is further configured to execute the following steps:
- determining whether or not the packet count and the default count are identical to each other; and
- transmitting, by the transceiver, the warning message to the ECU when the packet count is different from the default count.

4. The vehicle status detecting apparatus of claim 1, wherein each of the plurality of reference data includes a calibration rule, each of the plurality of bytes in the first packet data includes a number of bits, each of the pieces of status information includes a packet calibration value, and the processor is further configured to execute the following steps:
- calculating a default calibration value of one of the pieces of status information based on the calibration rule;
- determining whether or not the default calibration value and the packet calibration value are identical to each other; and
- transmitting, by the transceiver, the warning message to the ECU when the default calibration value is different from the packet calibration value.

5. The vehicle status detecting apparatus of claim 1, wherein the first internet packet includes a first packet identity, the plurality of reference data includes an averaged packet rate corresponding to the first packet identity, and the processor is further configured to execute the following steps:
- receiving, by the transceiver, a plurality of second internet packets transmitted by the ECU and a plurality of other ECUs during a time interval through the controller area network, the plurality of second internet packets include a plurality of second packet identities;
- calculating a number of the plurality of second packets whose second packet identity is identical to the first packet identity, so as to obtain a packet rate of the first packet identity during the time interval;
- determining whether or not the packet rate is greater than the averaged packet rate; and
- transmitting, by the transceiver, the warning message to the ECU when the packet rate is greater than the averaged packet rate.

6. The vehicle status detecting apparatus of claim 1, wherein the plurality of reference data include a plurality of ranges corresponding to the plurality of bytes, and the processor is further configured to execute the following steps:
- determining whether or not a plurality of values corresponding to the plurality of bytes are within the plurality of ranges corresponding to the plurality of bytes; and
- transmitting, by the transceiver, the warning message to the ECU when one of the plurality of values exceeds one of the plurality of ranges.

7. The vehicle status detecting apparatus of claim 1, wherein the first internet packet includes a packet identity, the packet identity corresponds to an application category, the plurality of reference data includes a trend curve of the application category corresponding to the packet identity, and the processor is further configured to execute the following steps:
- determining whether or not a peak value exists in the trend curve; and
- transmitting, by the transceiver, the warning message to the ECU when the peak value exists in the trend curve.

8. A vehicle status detecting method utilized in a vehicle status detecting apparatus, the vehicle status detecting apparatus including a transceiver, a storage device and a processor, the storage device storing a decode-related information and plurality of reference data the vehicle status detecting method being executed by the processor, the vehicle status detecting method comprising the following steps:
- receiving, by the transceiver, a first internet packet transmitted by an electronic control unit (ECU) through a controller area network, the first internet packet including a first packet data, the first packet data including a plurality of bytes, the plurality of bytes corresponding to pieces of status information of the ECU;
- decoding the first packet data according to the decode-related information, to obtain a plurality of data values of the pieces of status information corresponding to the plurality of bytes;
- detecting the plurality of data values of the pieces of status information corresponding to the plurality of bytes according to the plurality of reference data, to generate a plurality of detecting results of the pieces of status information; and
- transmitting, by the transceiver, a warning message to the ECU based on the plurality of detecting results when one of the plurality of detecting results exceeds a standard value corresponding to one of the plurality of reference data.

9. The vehicle status detecting method of claim 8, further comprising:
- receiving, by the transceiver, a plurality of second internet packets transmitted by the ECU through the controller area network, each of the plurality of second internet packets including a second packet data, each of the plurality of second packet data including the plurality of bytes;
- decoding the plurality of second packet data according to the decode-related information, to obtain a plurality of basic data values of the pieces of status information corresponding to the plurality of bytes;
- analyzing the plurality of basic data values to obtain a plurality of analysis results of the pieces of status information corresponding to the plurality of bytes; and
- setting the plurality of basic data values being the plurality of reference data based on the plurality of analysis results.

10. The vehicle status detecting method of claim 8, wherein each of the plurality of reference data comprises a default count, each of the pieces of status information comprises a packet count, the vehicle status detecting method further comprising:
- determining whether or not the packet count and the default count are identical to each other; and
- transmitting, by the transceiver, the warning message to the ECU when the packet count is different from the default count.

11. The vehicle status detecting method of claim 8, wherein each of the plurality of reference data includes a calibration rule, each of the plurality of bytes in the first packet data includes a number of bits, each of the pieces of status information includes a packet calibration value, the vehicle status detecting method further comprising:
- calculating a default calibration value of one of the pieces of status information based on the calibration rule;

determining whether or not the default calibration value and the packet calibration value are identical to each other; and transmitting, by the transceiver, the warning message to the ECU when the default calibration value is different from the packet calibration value.

12. The vehicle status detecting method of claim 8, wherein the first internet packet includes a first packet identity, the plurality of reference data includes an averaged packet rate corresponding to the first packet identity, the vehicle status detecting method further comprising:

receiving, by the transceiver, a plurality of second internet packets transmitted by the ECU and a plurality of other ECUs during a time interval through the controller area network, the plurality of second internet packets include a plurality of second packet identities;

calculating a number of the plurality of second packets whose second packet identity is identical to the first packet identity, so as to obtain a packet rate of the first packet identity during the time interval;

determining whether or not the packet rate is greater than the averaged packet rate; and transmitting, by the transceiver, the warning message to the ECU when the packet rate is greater than the averaged packet rate.

13. The vehicle status detecting method of claim 8, wherein the plurality of reference data include a plurality of ranges corresponding to the plurality of bytes, the vehicle status detecting method further comprising:

determining whether or not a plurality of values corresponding to the plurality of bytes are within the plurality of ranges corresponding to the plurality of bytes; and transmitting, by the transceiver, the warning message to the ECU when one of the plurality of values exceeds one of the plurality of ranges.

14. The vehicle status detecting method of claim 8, wherein the first internet packet includes a packet identity, the packet identity corresponds to an application category, the plurality of reference data includes a trend curve of the application category corresponding to the packet identity, the vehicle status detecting method further comprising:

determining whether or not a peak value exists in the trend curve; and transmitting, by the transceiver, the warning message to the ECU when the peak value exists in the trend curve.

* * * * *